March 23, 1937.                F. X. AICHELE                2,074,767
                        CAMERA SHUTTER CONTROL DEVICE
                        Original Filed March 15, 1935
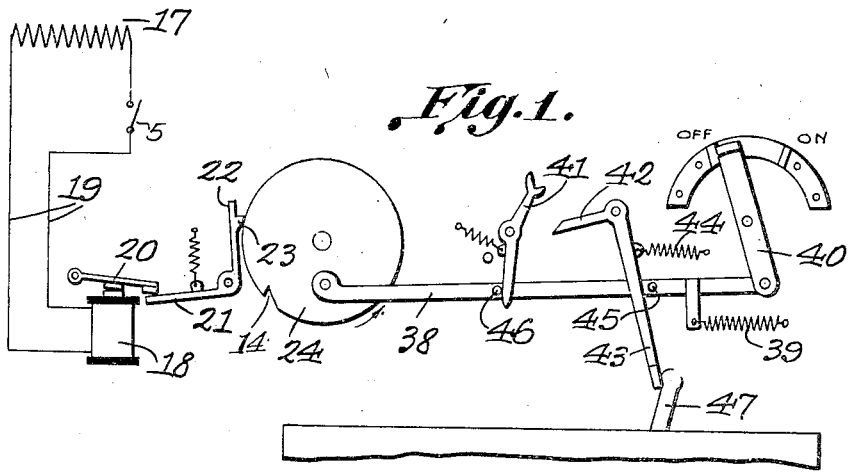
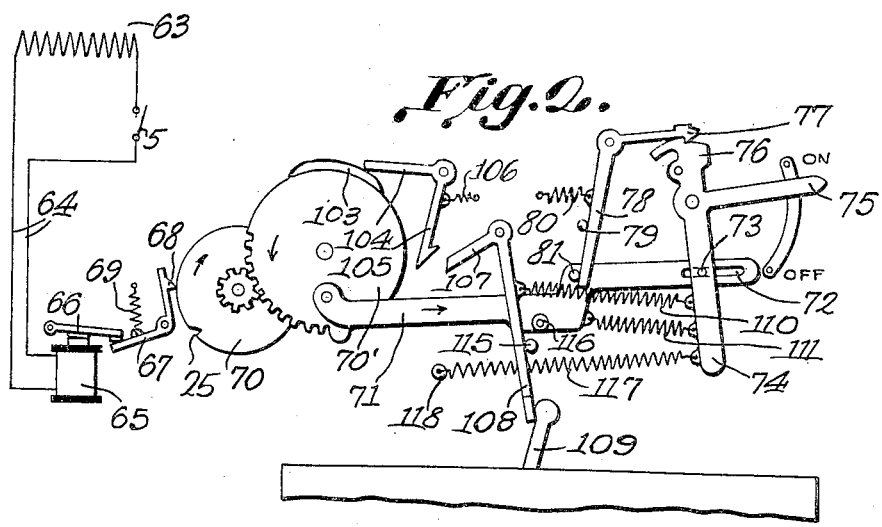
Frank X. Aichele, Inventor
By C.A. Snow & Co., Attorneys Patented Mar. 23, 1937

2,074,767

UNITED STATES PATENT OFFICE 2,074,767

CAMERA SHUTTER CONTROL DEVICE

Frank X. Aichele, East St. Louis, Ill.

Application March 15, 1935, Serial No. 11,366
Renewed February 1, 1937

2 Claims. (Cl. 95—53)

This invention relates to cameras, the primary object of the invention being to provide a camera shutter control device which will operate to automatically open and close the camera shutter, photographing the objects with which the camera is in focus.

Another object of the invention is to provide a shutter control device of this character embodying electrically actuated means for releasing a spring controlled latch mechanism, whereby the latch mechanism will operate immediately upon the completion of a circuit.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a view illustrating a camera shutter actuating mechanism constructed in accordance with the invention, the camera shutter control device having been moved to operate the shutter control lever.

Figure 2 illustrates a modified form of a shutter control lever actuating mechanism, wherein the mechanism is automatically reset.

Referring to the drawing in detail, the main circuit of the device which plays an important part in the operation of the mechanism, includes a switch 5, which is in circuit with the magnet 18 through the wires 19, there being a transformer 17 in the circuit whereby the electric wires of the circuit may be plugged into the usual house circuit.

The reference character 20 designates an armature that is attracted by the magnet 18, the armature 20 being pivotally supported adjacent to the magnet, the free end of the armature resting on one end of the arm 21, which is pivotally supported within the casing of the mechanism. The arm 21 includes a right angled end portion 22 formed with an enlargement 23 adapted to fit into the notch 14, formed in the periphery of the disc 24, normally holding the disc 24 against movement and at the same time holding the mechanism in its inactive position, or in a position to actuate the shutter lever with which the mechanism is associated.

Pivotally connected to the disc 24 is a bar 38 that is normally urged in one direction by means of the coiled spring 39, there being provided a setting arm 40 connected to one end of the bar 38, for moving the bar to set the mechanism.

Mounted within the case of the mechanism is a dog 41 that engages the extension 42 of the pivoted shutter operating arm 43 of the mechanism, normally holding the arm 43 in a set position. A coiled spring indicated by the reference character 44 has connection with the arm 43 and normally urges the arm in one direction. The arm 43 is moved to its set position by means of the pin 45, which is adapted to hold the arm 43 when the bar 38 has been returned to a set position.

Extending from the bar 38 is a pin 46 that is adapted to engage the lower end of the dog 41, moving the upper end of the dog 41 out of engagement with the extension 42, allowing the spring 44 to snap the shutter operating arm, accomplishing the purpose of the invention.

As clearly shown by the drawing, the arm 43 engages the lever 47 of the usual camera shutter operating mechanism, and when the arm 43 is operated, the lever 47 is moved to the position shown by Figure 1, with the result that the shutter is operated, and a photograph of the object with which the camera is in focus is made.

In the form of the invention shown by Figure 2 of the drawing, the reference character 63 designates a transformer in the circuit, wires 64 leading from the transformer being in circuit with the magnet 65. The armature 66 of the magnet is normally contacting with the bell crank lever 67 that carries a lug 68 near one end thereof. A coiled spring 69 connects with the bell crank lever and normally urges the lug 68 into the notch 25, formed in the periphery of the rotary disc 70, which in turn is provided with teeth meshing with teeth formed on the periphery of the disc 70', thereby retarding the movement of the disc 70' when the device operates.

Eccentrically connected to the rotary disc 70' is a bar 71 that is provided with an elongated opening 72, in which the pin 73 of the lever 74 extends. This lever 74 has an arm 75 whereby the lever 74 may be operated for manually setting the lever 74.

The upper end of the lever 74 is formed with a head 76, which is provided with a shoulder engaged by the hook 77 of the lever 78, the lever 78 being normally held against the pin 79 by means of the coiled spring 80.

A pin indicated by the reference character 81 extends from the bar 71, and rises in the path of travel of the arm 78 to pick up the arm when the bar 71 moves in one direction, thereby tilting the arm 78 to release the lever 74. A cam indicated by the reference character 103 is formed on the periphery of the disc 70', and is adapted to engage the end 104 of the lever 105 as the disc 70' rotates. The end 104 of the lever 105 is normally held into engagement with the cam 103, by means of the spring 106. A shoulder is formed at one end of the lever 105 and engages the arm 107 of the lever 108, which lever 108 engages the shutter control lever 109 of the camera.

As clearly shown by the drawing, the levers 108 and 74 are urged toward each other by means of the coiled spring 110, and spring 111, this construction being such that when the bar 71 moves laterally under the action of the springs 110 and 111, the lever 78 will be released. It will, of course, be understood that the cam 103 will act to release the lever 108, the spring 110 operating the lever 108 to move the shutter control lever 109 of the camera, taking a picture. A pin 116 extends laterally from the bar 71, and when the device is in a set position, rests against the lever 108 and is adapted to move the lever 108 to its set position by the action of the heavy spring 117 that has connection with the lever 74 at one of its ends, the opposite end of the spring being anchored at 118. Thus it will be seen that after the device operates to photograph an object, the device is automatically reset, through the action of the springs.

In the operation of the apparatus as shown by Figure 1 of the drawing, the apparatus in its set position will be moved so that the lug 23 engages in the notch 14 of the disc 24, which movement causes the armature 20 to disengage the magnet 18. When the switch 5 is closed, electric current passes to the magnet 18, which attracts the armature 20, moving the arm 21 downwardly, with the result that the end portion 22 of the arm 21 rocks, disengaging the lug 23 from the notch 14. The disc 24 now moves in the direction of the arrow by the action of the spring 39. As the bar 38 is moved by the action of the spring 39, the pin 46 engages the dog 41, moving the dog 41 out of contact with the extension 42 of the arm 43, whereupon the spring 44 moves the arm 43 against the shutter lever 47 of the camera, which results in operating the shutter of the camera, photographing an object.

In the form of the invention as shown by Figure 2 of the drawing, the circuit is completed to the magnet 65 by closing the manually operated switch 5 of the mechanism, whereupon the armature 66 is attracted, which movement actuates the bell crank lever 67, moving the lug 68 from the notch disposed in the periphery of the rotary disc 70. The disc 70 is now free to rotate under the action of the coiled spring 111, which pulls the bar 71 to the right.

When the lever 108 moves into engagement with the stop pin 115, the spring 110 will act to move the lever 74 to the left until the pin engages the end of the elongated opening 72. The coiled spring 117 now advances the lever 74 toward the lever 108, where the pin 116 moves the lever 108 to its set position.

I claim:

1. A device of the character described, comprising the combination with a camera and the shutter thereof, of a camera shutter control device embodying a disk, a bar connected with the disk and adapted to rotate the disk, yieldable means for urging the bar in one direction to operate the disk, means operated by the bar for operating the camera shutter and electrically controlled means adapted to release the disk and bar to the action of the yieldable means.

2. A device of the character described, comprising the combination with a camera and shutter thereof, of a camera control device embodying a disk, a bar pivotally connected with the disk, yieldable means adapted to operate the bar and disk, a latch member normally holding the disk against movement, electrically controlled means for releasing the disk and bar to the action of the yieldable means, and means controlled by the bar for operating the shutter of the camera

FRANK X. AICHELE.